United States Patent [19]
Hawkins

[11] 3,939,300
[45] Feb. 17, 1976

[54] FRAMELESS DAMPING SPACER WITH CLOSE COIL SPRING

[75] Inventor: Ronald G. Hawkins, Massena, N.Y.

[73] Assignee: Aluminum Company of America, Pittsburgh, Pa.

[22] Filed: Feb. 24, 1975

[21] Appl. No.: 552,183

[52] U.S. Cl. ............... 174/42; 174/146; 188/1 B; 403/111; 403/117; 403/162; 403/170; 403/229
[51] Int. Cl.² ............... H02G 7/14; H02G 7/12
[58] Field of Search ............... 174/40 R, 42, 146; 188/1 B; 267/47, 48, 135, 136, 137, 141, 155; 403/64, 111, 113, 117, 120, 162, 170, 174, 175, 178, 217, 218, 229

[56] References Cited
UNITED STATES PATENTS

| | | | |
|---|---|---|---|
| 2,587,168 | 2/1952 | Kessler | 403/117 |
| 3,617,609 | 11/1971 | Tuttle | 174/42 |
| 3,777,047 | 12/1973 | Rawlins | 174/42 |

FOREIGN PATENTS OR APPLICATIONS

| | | | |
|---|---|---|---|
| 954,710 | 4/1964 | United Kingdom | 174/146 |
| 1,084,102 | 9/1967 | United Kingdom | 174/146 |

*Primary Examiner*—Laramie E. Askin
*Attorney, Agent, or Firm*—Elroy Strickland, Esq.

[57] ABSTRACT

A device for spacing overhead, parallel subconductors of a conductor bundle and for damping vibrations of the subconductors. The device comprises rigid, elongated arms pivotally connected to each other by a rigid means at one end of each arm, with the other end of each arm being radially spaced from the rigid means and provided with a clamp for attaching the arm to a subconductor. Resilient damping devices, such as close coil springs, are secured in the arms at a location adjacent the rigid means pivotally connecting the arms to each other.

15 Claims, 9 Drawing Figures

FRAMELESS DAMPING SPACER WITH CLOSE COIL SPRING

BACKGROUND OF THE INVENTION

The present invention relates generally to a damping spacer for overhead conductors, and particularly to a compact damping spacer that has no central frame, is economical to manufacture, is light in weight, and requires a minimum of parts and material.

There are presently available a large variety of devices for spacing overhead, parallel conductors and for damping vibrations and oscillations of such conductors. However, all of these devices have certain disadvantages that the damping spacer of the present invention does not have. Many of the presently available damping spacers, for example, employ a central frame on which conductor clamps are mounted, as a part of the structure designed to effect spacing of the conductors, and stop or motion limiting means associated with the frame and clamps for protecting damping elements of the spacer from excessive forces that may be encountered in overhead bundle conductors. The clamps of these devices usually have relatively short arms, and are often connected to the frame only through the agency of the damping elements so that the damping elements are required to support the weight of the frame. This tends to reduce the life and damping efficiency of the damping elements.

The use of a frame and certain motion limiting means is costly in that the components involved, and the process of assembling them, involves costs that are reflected in the ultimate selling price of the spacer. Further, the short arms of the clamps do not provide a sufficiently effective lever for working rather stiff, high tensile strength damping elements that are employed because of their higher strength and longer life characteristics. Such elements require high thresholds of vibration energy before damping action is initiated in comparison to softer, shorter lived elements.

A further disadvantage of the frame type of spacer is the fact that mass and weight of the frame add to the overall weight of the spacer, which weight must be borne by the conductors to which the spacer is attached. Also, the additional weight involves additional cost in the process of shipping and transporting such spacers.

Examples of damping spacers employing a central frame and relatively short clamp arms are shown in U.S. Pat. Nos. 3,083,258, 3,443,019, 3,474,184, 3,613,104, 3,748,370 and 3,777,047. Examples of spacers in which damping elements support the weight of a frame are shown in the above U.S. Pat. Nos. 3,083,258, 3,443,019, 3,748,370, 3,777,047, as well as in U.S. Pat. Nos. 3,582,983, 3,617,609 and 3,702,371.

Figure 4:
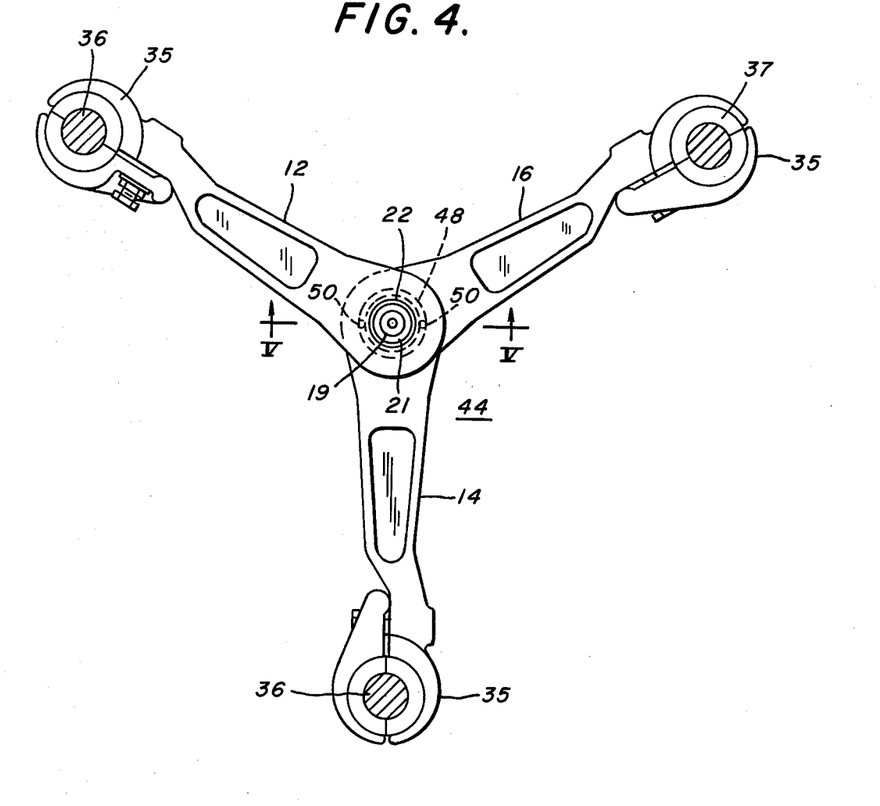
FIG. 4 is a side elevation view of another embodiment of the invention.
Figure 5:
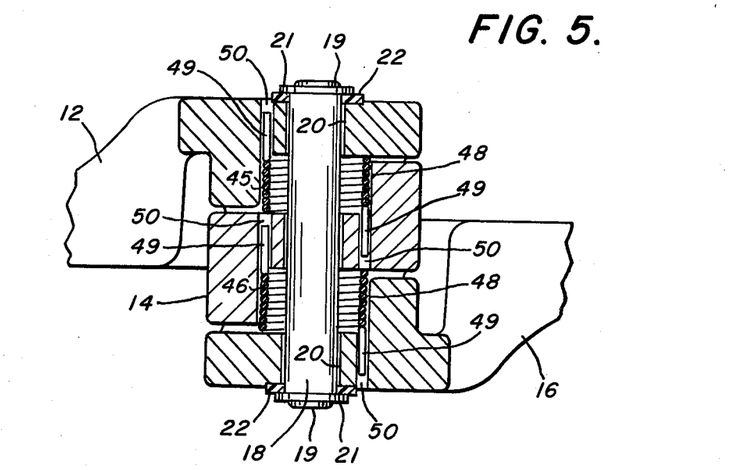
FIG. 5 is a sectional view of the structure of FIG. 4 taken along lines V—V of FIG. 4.

Another problem encountered with certain of the presently available damping spacers is the inability of the arms of the spacers to return to their original, normal position after the arms are moved in response to conductor motion. The large power authorities, such as the Tennessee Valley and Bonneville Power Authorities, generally require that the spacer arms of a spacer return to a normal position under their own effort. Damping spacers using friction discs as the damping elements, for example, either depend upon the return movement of the conductors to return the spacer arms to their normal, original position, or a spring element is required to return the arms. Further, a spring element is required to compensate for wear of the friction disc. A damping spacer using such friction discs and spring elements is shown in U.S. Pat. No. 3,474,184, listed above. In FIGS. 4 and 5 of British Pat. No. 1,084,102, a damping spacer is shown in which friction discs are used without a spring element to return the spacer arm to a normal position. Spring elements, however, are used to preload the friction discs against the arms of the spacer in the British patent.

Another disadvantage of some presently available and prior devices for spacing conductors is the inability of these devices to insure spacing of the conductors under severe, short circuit conditions. Short circuits on a conductor bundle involve flows of heavy current through the conductors that generate a corresponding strong magnetic field component that directs the conductors rapidly inwardly in a straight line toward the geometric center of the bundle, and thus toward each other. Unless a rigid spacing structure is provided to directly resist these forces, the conductors will come together and become entangled with one another.

A central, rigid frame, used in the type of spacer discussed above, is helpful in this regard but suffers from the disadvantages of frame type spacers discussed above. U.S. Pat. No. 3,230,295 shows a conductor spacing device that would function as an effective spacer under short circuit conditions, if constructed of suitably rigid, high strength materials but the device is not an effective damper of conductor vibration or oscillation since it does not employ a mechanism that is capable of dissipating the energy of such vibration or oscillation in any significant manner.

A further problem with certain, presently available damping spacers is the heavy stresses and cycling imposed upon the damping elements of the spacers by "articulation" of the spacer within a bundle of conductors. Individual conductors in a span of a conductor bundle tend to move relative to one another in a lengthwise or longitudinal direction of the conductors due to unequal contraction and stretching of the conductors, and due to the wind blowing across the conductors at velocities that bow the conductors in the direction of the wind by different amounts. These relative conductor movements and bows are large and thus cause any spacers clamped to the conductors to articulate within the bundle by corresponding large amounts. If the clamps clamping the spacer in the bundle are connected to a frame of the spacer through the agency of the damping elements, the damping elements are heavily worked and stressed by such articulation, such heavy working greatly shortening the life of the damping elements. This is true even when resilient bushings are employed between the spacer clamps and the conductors. In order for such bushings to effectively protect the damping elements from such articulating movements, and the resulting heavy stresses, the bushings would have to be soft to the point that they would not effectively grip the conductor. Examples of damping spacers in which the damping elements of the spacers would be unprotected from such articulation stresses are shown in the above listed U.S. Pat. Nos. 3,582,983 and 3,702,371. An example of a spacer particularly designed to provide articulation movements within the spacer is shown in U.S. Pat. No. 3,263,021. Such a structure, however, provides little or no damping of conductor vibration or oscillation.

Another problem associated with presently available damping spacers is the general inefficiency of the mechanism associated with the spacers that provides the damping function. For example, the damping means associated with frame type spacers generally work independently of each other in damping vibration of one conductor of a bundle of conductors so that only one damping element is operable to dampen the vibration, the other elements remaining inactive and unused.

BRIEF SUMMARY OF THE INVENTION

Broadly, the present invention is directed to a damping spacer that does not have the disadvantages of the spacers discussed above and has, therefore, the advantages of being light in weight, economical to make, rigid in the direction of the forces produced by short circuits on a line so as to resist collapse of the spacer and the bundle, and efficient in damping oscillations and vibrations of the conductors. These advantages result from a frameless spacer structure comprised simply of rigid spacer arms pivoted to each other at one end of each arm by means of a single pin or bolt, for example, with the arms extending radially outwardly from the location of their pivoted ends to respective conductors of a bundle, the arms having clamps at the conductor ends for clampling to respective ones of the conductors. Damping oscillation or vibration of one or more of the conductors is efficiently effected by the translation of the turns of a close coil helical spring or the shear of a viscoelastic body when a conductor vibrates, the spring or body being secured between the arms of the spacer and a plate member, in certain embodiments of the invention, secured to the arms at the location of the pivot. The translation of the turns of the spring or the shear of the viscoelastic body is sufficient to generate heat which is dissipated to the atmosphere, the dissipation of heat being effective to dissipate the energy of the motion of a conductor. Since the arms of the spacer are rigid and radiate outwardly from a center location of a conductor bundle, spacing of the conductors is assured under short circuit conditions, the forces generated by such conditions being in line with the rigid arms which directly oppose these forces. With such a structure and function, no frame is necessary and no motion limiting means is needed to protect the damping element from such forces, though such a means can be inexpensively provided in a manner explained in detail hereinafter. Rather, the rigid pin at the pivot location receives the forces generated by such short circuiting, as well as receiving other forces and stresses, such as caused by articulating movements of the spacer. When the conductors are motionless, for example, the spring or viscoelastic body is free of the weight of the spacer and the resulting stress, the life of the spring or body being thereby lengthened and the damping efficiency thereof maintained.

THE DRAWINGS

The invention, along with its advantages and objectives, will be better understood from consideration of the following detailed description and the accompanying drawing in which.

PREFERRED EMBODIMENTS OF THE INVENTION

Figure 1:
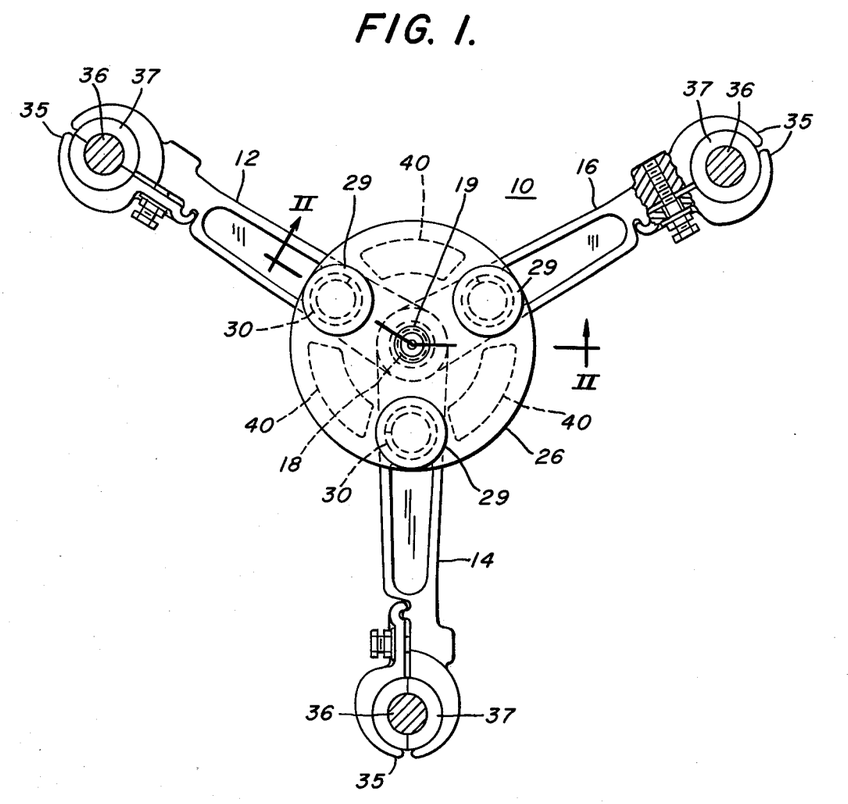
FIG. 1 is a side elevation view of a three conductor damping spacer of the invention.
Figure 2:
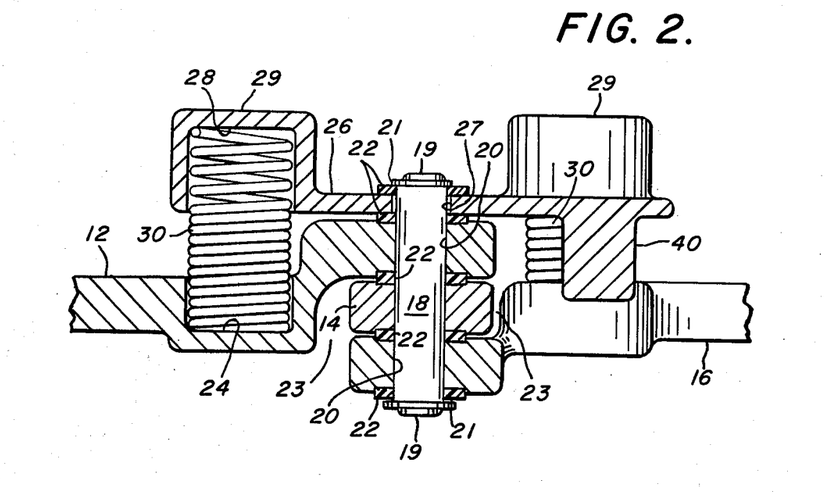
FIG. 2 is a sectional view of the structure of FIG. 1 taken along line II—II of FIG. 1.

Referring now to the drawing, FIG. 1 of the drawing shows a damping spacer 10 having three, elongated, rigid spacer arms 12, 14 and 16 connected together at one of their ends and at or adjacent a common, central location of the spacer by a rigid pin 18 extending through aligned openings 20 (FIG. 2) provided in overlapping end portions of the spacer arms. Preferably, pin 18 is riveted at each of its ends to secure the arms together, thereby eliminating the use of threaded fasteners which may become loose under the vibrating conditions encountered by the spacer. The securing function is effected by a flange portion 19 formed on each end of the pin when the pin is riveted. In FIG. 2, metal washers 21 are shown located immediately beneath the flange portions and around the pin, and second, heat resistant washers 22 are located beneath the metal washers, as well as between the spacer arms.

The diameter of the openings 20 in the arms corresponds closely to the diameter of pin 18, the openings providing the arms with bearing surfaces that fit closely or snugly around pin 18. However, the snug fit is such that the arms are allowed to pivot relatively on and about the pin when the conductors to which the arms are attached undergo oscillation or aeolian vibration.

As best seen in the view of FIG. 2, one of the three arms (arm 14) is located between two outside arms (12 and 16), the two outside arms being preferably offset to place the major extent of the three arms in planes closely approximating a common plane. The offsets of the outside arms provide relatively deep, opposed recesses or cavities 23 in the outside arms, which recesses accommodate therein the end of the center arm.

The spacer arms are each provided with a further recess 24 located closely adjacent to but radially spaced from the recesses 23. The recesses 24 face in the direction of a plate member 26 located in general parallel arrangement with the spacer arms, the plate member being connected to the arms by pin 18 extending through an opening 27 provided in the member and located in alignment with the openings 20 in the arms. The plate member is provided with integral cups 29, the cups providing recesses 28 in the plate. The number of such cups and recesses correspond to the number of spacer arms, and are radially spaced from the center of the plate member such that the cup recesses can be aligned with the recesses 24 in the arms when the plate member is connected to and centered on the arms by pin 18. In this manner, the recesses in the arms and plate members form opposed recesses for receiving and holding damping elements between the opposed recesses in a manner presently to be explained.

As best seen in FIG. 2, close wound helical coil springs 30 are located between and extend into each of the opposed recesses 24 and 28, the axes of the springs being generally parallel with the axis of pin 18 and with each other, and perpendicular to the general planes and axes of the spacer arms. The diameters of the end portions of the springs closely approximate the diameters of the recesses 24 and 28 so that the springs are held firmly in place by the walls of the recesses. However, the longitudinal center portion of each spring is free of the walls of the recesses so that the helical turns of the springs in this center portion are free to slide relative to one another as the mechanism for damping conductor vibration in a manner explained in detail hereinafter. The coils of the end portions of the springs located within the recesses 24 and 28 will not, of course, be free to slide so that these portions may include open wound turns, as shown in FIG. 2.

In place of the coil springs 30, or in combination therewith, a viscoelastic body or bodies having the same, general dimension and configuration as the springs 30, may be used as the damping elements in the manner explained hereinafter in connection with another embodiment of the invention.

At the end of each of the spacer arms 12, 14 and 16 opposed to the ends connected together by pivot pin 18 is located means 35 for clamping each arm to a respective sub-conductor 36 of a three conductor bundle, one-half of each clamping means being fabricated preferably as an integral part of its associated arm, as indicated in FIG. 1. The arms and integral clamp halves, for example, may be formed by a casting of forging process using a suitable aluminum alloy to provide a device that is light in weight yet has a rugged high strength characteristic. The clamp halves may directly engage the conductors 36, or, the curved seats of the clamp halves may contain bushing halves 37 (FIG. 1) made of a semiconducting, resilient material.

The plate member 26 may be further provided with three, curved, integral projections 40 extending in the direction parallel but opposed to cups 29 so that the projections are located between the springs 30. In FIG. 2, only one of the projections is visible and is shown in vertical section. In FIG. 1, the three projections are indicated in dash outline. These projections function as a means to limit relative motion of the arms and thereby protect coil spring 30 from excessive conductor movements in a manner explained hereinafter.

The operation of the damping spacer of FIGS. 1 and 2 is as follows. With the movement of one of the conductors 36 in the general plane of the spacer 10, as would occur with air currents causing aeolian vibration or oscillation of the conductor, the spacer arm associated with the moving conductor pivots on pin 18 and rotates to set all three of the springs 30 in motion in a united, team effort to dampen the conductor motion. This is the result of the unique structure of the spacer 10, and is explained in the following manner. With a vertical, downward motion of the conductor associated with arm 16 in FIG. 1, for example, which motion would occur with the conductor undergoing aeolian vibration, the arm 16 is moved in a downward direction as it pivots about pin 18. The downward movement of the arm translates the portion of the spring in the recess 24 of the arm relative to the portion of the spring held in cup 29 of plate 26 in a direction perpendicular to the axis of the coil. The translation of this spring, however, tends to rotate plate 26 with respect to the other two spacer arms (12 and 14) such that the springs associated with these arms are also translated in the manner of the first spring. When the downward movement of the conductor associated with arm 16 stops and the conductor begins its vertical rise (in the aeolian cycle), the above order of arm and spring movements is reversed. The translation of the springs slides the turns or coils of the springs that are free of the recesses 24 and 28 relative to each other so that heat is generated by the resulting friction. This heat is quickly dissipated to the spacer arms and plate member, and to the atmosphere thereby dissipating the energy received by the conductor from the air currents causing vibration of the conductor, the air currents themselves helping to carry away the heat generated by the friction between the spring turns. With all three coil springs working in this manner for any one (or more) vibrating conductor, the vibration is rapidly stopped. The efficiency and effectiveness of such a damping function is in sharp constrast with that of a frame-type of spacer in which associate clamp arms and damping elements are generally separately mounted and pivoted. With such a structure, only the damping element directly associated with the vibrating conductor is generally operable to dampen the vibration.

The spacer 10 provides further damping action by the sliding friction that takes place between the bearing surface 20 of a moving spacer arm and the rounded surface of pin 18, the resulting heat being dissipated into the arm and pin and to the atmosphere to dissipate the energy of vibration.

With the relative rotational movement of the spacer arms about pin 18 caused by conductor vibration, sliding friction also occurs between the heat resistant washers 22 and the flat surfaces of the arms and plate member in contact with the washers. Such friction provides additional damping action, as the heat generated by the friction is dissipated into the arms and to the air currents moving past the spacer.

The damping action described above in connection with aeolian vibration is similarly effective to dampen oscillations of a conductor 36, which oscillation involves a generally circular or elliptical motion about the axis of the conductor at rest, such a motion tending to simultaneously place all three of the coil springs 30 in damping motion.

Under conditions that might cause violent, excessive movements of the conductors 36, by hurricane winds, for example, it is preferable that the damping springs by protected from the resulting excessive movement of the spacer arm or arms associated with the moving conductors. This is accomplished by the projections 40 on plate member 26, the projections serving to stop relative rotation of the spacer arms when an arm abuts against one of the projections. Thus, if the conductor 36 associated with arm 16 moved an excessive amount about pin 18, arm 16 moves into contact with the projection 40 that lies in the direction of the arm movement. In this manner, the damping springs are protected from excessive movement of a conductor and its associated spacer arm.

In addition, any impact occurring between projections 40 and the spacer arms is effective to at least assist in dissipating the energy of the conductor motion in the form of heat.

The projections 40 are an inexpensive stop and impact damping means to provide since they can be conveniently formed when the plate member 26 is made, by a casting or forging process, for example.

With spacer 10, while the arms of the spacer are at rest, the damping elements (springs 30) are free of stress, there being no frame or other structure to be supported by the elements. In this manner, the life of the springs and their effective operation as the damping mechanism are extended. Yet, since the springs 30 are resilient elements and retain the memory of their original, at rest position, the springs return the arms of the spacers and the associated conductors 36 to a normal, original position when the conductors are moved from their normal position by any substantial amount.

Further, the clamp arms of spacer 10 are relatively long such that they provide substantial leverage (over the short arm extensions of some prior damping spacers) that is more effective in placing relatively heavy or stiff damping elements in shear. Thus, the spacer of the present invention can be provided with a greater threshold of damping action in comparison to those devices providing small leverage on the damping mechanism, with the added advantage of the higher tensile strengths that is a characteristic of such elements.

As explained earlier, with certain prior damping spacers, articulation of the spacer within a bundle, which is due to large, longitudinal movements of the conductors involved, places heavy stresses on the damping elements. In the present invention, the close, snug fit existing between the rigid pin 18 and the rigid, pivot ends of the spacer arms prevents the damping elements 30 of spacer 10, from being worked and stressed by such articulation. Rather, in the spacer of FIGS. 1 and 2, articulation stresses are absorbed by the thick resilient bushings 37 provided in the clamps 35 of the spacer arms. In the case where the clamps 35 directly engage the conductors, the spacer arms can then be resiliently spaced apart on the pivot pin 18 to permit relative movement of the arms along the pin for the purpose of accommodating relative longitudinal movements of the conductors.

Another advantage of the damping spacer of the invention is associated with the location of the spacer arms and pivot pin 18 and their relation to the general center location of the spacer. As discussed earlier, short circuits on a line generate forces that are directed inwardly to the center of the bundle such that the conductors are forces toward the center and thus toward each other. Since the pivot pin and arms of the spacer of the invention are rigid, and since the arms extend directly into the center of the bundle when installed in the bundle, and to the pin, the arms and pin are directly in line with such forces such that these forces are easily and directly resisted by the structural column of the arms and by the pin. In this manner, the conductors of the bundle are prevented from coming together when a short circuit occurs on the bundle. The size and material of the arms and pin are such that their strength is sufficient to handle the shear and compression forces that act on the pin and arms. In addition, since such inwardly directed forces are in line with the rigid column of the arms and pin, the necessity for mechanical stop or motion limiting means to protect the damping elements from such forces is removed. Further, the spacer 10 is economical to manufacture in that only a minimum of simple, inexpensive components are required. As indicated earlier, no frame is required, and the spacer arms, plate member and clamps are easily cast or forged. The coil springs, the pin, and the washers associated with the pin and arms are relatively inexpensive components that are readily assembled enabling manufacture of the spacer of the invention on a mass-produced basis, the consequent unit cost of the spacer being quite low. This, coupled with the fact that the minimum number of components involved provides a light weight device, providing further economies in shipping and handling the device, makes the damping spacer 10 economically attractive over heavier, more costly and more complicated spacing devices while simultaneously providing a structurally sound and rugged device.

Figure 3:
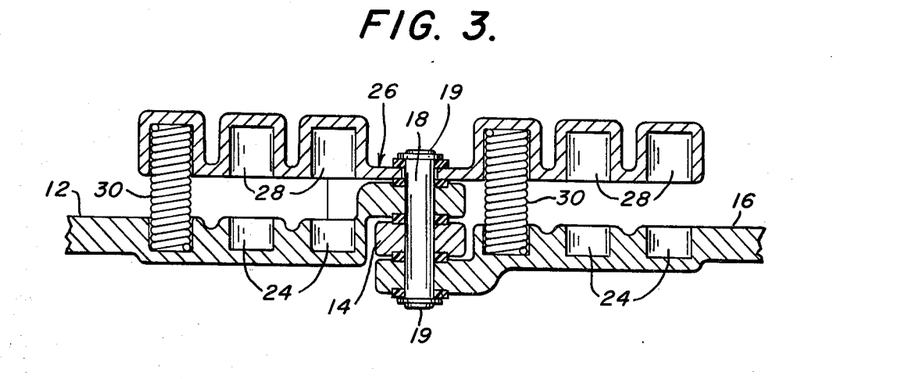
FIG. 3 is a sectional view of an alternative clamp arm and hub structure of the invention providing an adjustable feature.

The damping effort provided by the spacer of FIGS. 1 and 2 can be conveniently and inexpensively made adjustable by providing the clamp arms of the spacer with a plurality of recesses 24 and the opposed plate member 26 with a corresponding plurality of recesses 28, as shown in FIG. 3, the recesses in the arms being spaced apart lengthwise of the arms between the pivot and clamp ends of the arms. The recesses in the plate member are located in radially extending rows. The plurality of recesses in each of the arms and in the plate member of FIG. 3 are sized in the cross section of a damping element, such as the coil springs 30 shown in FIG. 3, adapted to provide the necessary damping of a line. In this manner, the damping elements are snugly received and held in appropriate ones of the recesses. By locating the damping element in an appropriate one of the recesses of the arm or arms and plate member when the spacer 10 is assembled, an arm or arms of a predetermined lever length, having a predetermined mechanical advantage, is chosen for effecting translation of the associated damping elements.

For example, by locating a damping element near the clamp end of the arm, a relative short lever is provided to work the damping element, whereas, with the damping element located near the pivot pin 18 of spacer 10, a larger lever is provided to translate the damping element, the difference in levers providing a corresponding difference in the amount of force and energy required to translate the damping element.

In FIGS. 4 and 5 of the drawings, a damping spacer embodiment 44 is shown in which the plate member of the embodiment of FIGS. 1 and 2 is not required, and which utilizes only two close wound, helical springs (45 and 46) to provide damping in a three conductor bundle spacer. (Applying the principles of FIGS. 4 and 5 to a two conductor bundle spacer, only one damping spring would be required.)

More particularly, spacer 44 is similar to the spacer of FIGS. 1 and 2 in that it employs three rigid, spacing columns, in the form of clamp arms 12, 14 and 16, pivotally connected to each other at or adjacent a central location of the spacer by a rigid pin 18, with clamps 35 radially spaced from the central location for attaching the spacer to the parallel conductors 36.

As best seen in sectional view of FIG. 5, two close coil springs 45 and 46 are located in recesses 48 provided in the pivot ends of the clamp or spacer arms, the springs and recesses being preferably concentric with openings 20 provided in the arms, and pivot pin 18 extending through said openings. The springs 45 and 46 are axially aligned with each other, with opposed ends of the springs having straight extensions 49 extending into narrow openings 50 provided in the arms, the extensions and openings extending in the axial direction of the springs and thus in parallel relation to pin 18.

The spacer of FIGs. 4 and 5 functions in a manner similar to that described above in connection with spacer 10 except that sliding friction between adjacent turns of springs 45 and 46 occurs with relative rotation of the turns caused by the relative translation of end extensions 49 of the springs when one of the spacer arms moves relative to the other.

The structure of FIGS. 4 and 5 is an inexpensive damping device to make since it requires a minimum of inexpensive parts, including only two damping springs for stopping the vibrations encountered in a three conductor bundle spacer.

Figure 6:
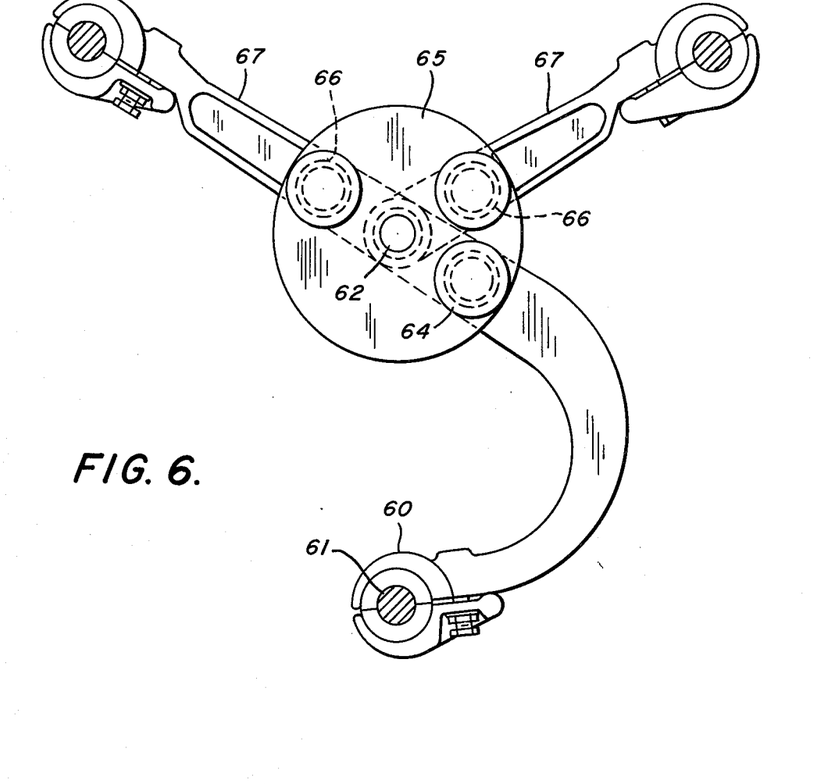
FIG. 6 is an elevation view of yet another embodiment of the invention.

As indicated earlier, aeolian vibration of an overhead conductor occurs in an essentially vertical plane such that, with a rigid clamp arm of a spacer connected to a conductor located directly vertically beneath or above the center of the spacer and its pivot pin, the arm is not compliant in the vertical direction to effect movement of the damping element associated with the arm, though the spacer itself is compliant since the arms not extending in a vertical direction will tend to pivot about the pivot pin with vertical movement of the vertical arm. FIG. 6 of the drawings shows an embodiment of the invention in which the arm of a clamp 60 clamped to a conductor 61 located in vertical alignment with a pivot pin 62 is curved to locate a damping element 64, associated with the arm, in a position that is offset from and out of vertical alignment with the pivot pin 62 and the conductor 61. In this manner, with vertical, aeolian vibration of conductor 61, the curved arm pivots about pin 62 and thereby effects movement of the damping element 64, and, through associated plate member 65, effects movement of the damping elements 66 respectively associated with straight clamp arms 67, to stop the vibration of the conductor by dissipating the energy of the vibration in the form of heat. The plate member, the clamp arms and the damping elements in the embodiment of FIG. 6 are secured together in the manner described above in connection with the embodiment of FIGS. 1 and 2.

Figure 7:
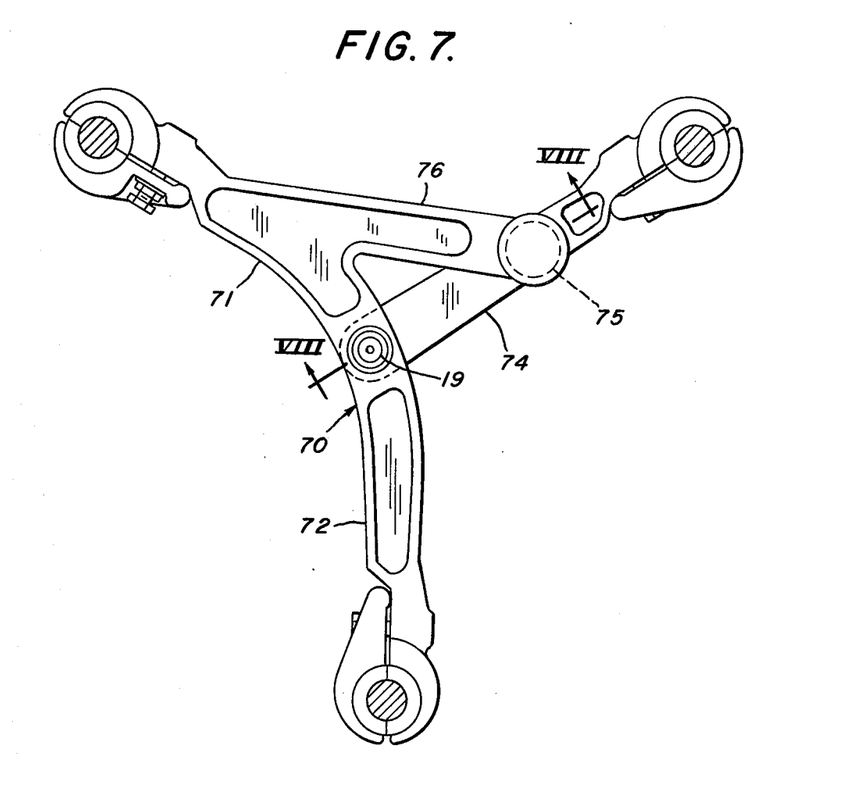
FIG. 7 is an elevation view of still another embodiment of the invention.
Figure 8:
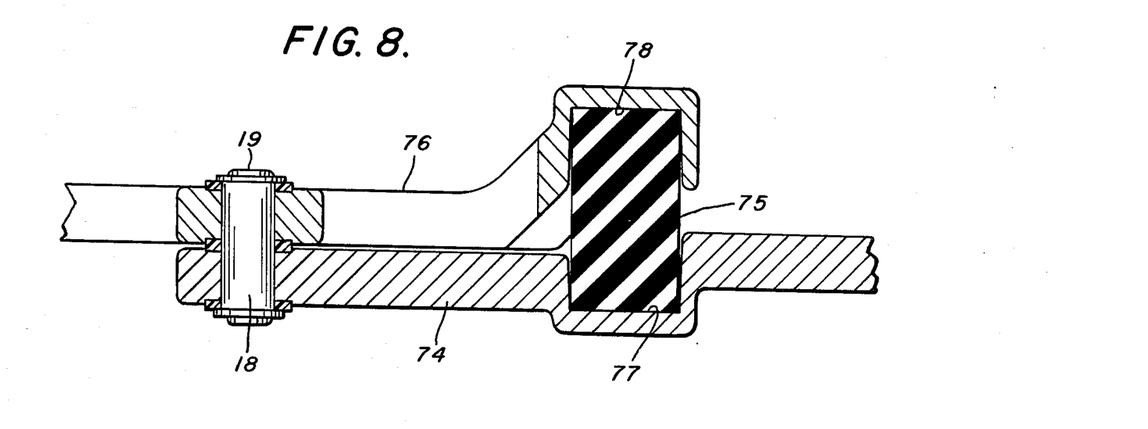
FIG. 8 is a partial vertical section of the embodiment of FIG. 7 taken along lines VIII—VIII of FIG. 7.

In FIGS. 7 and 8 of the drawings, an embodiment of the invention is shown in which a unitary arm structure 70 provides two spacer arms 71 and 72 of a conductor bundle spacer, with a third spacer arm 74 being pivotally connected to the unitary structure at a location 18 intermediate clamp ends of the unitary structure.

The unitary structure 70 and the third arm 74 are resiliently connected together by a damping element 75 located between the third arm and an integral extension 76 of structure 70, the integral extension extending to a location that overlaps the third arm and a depression or recess 77 (FIG. 8) provided in the third arm for receiving one end of damping element 75. In FIG. 8, the damping element is shown as a viscoelastic body, though a close would spring can be used in place thereof. The extension 76 is similarly provided with a recess 78 dimensioned to receive the other end of the damping element 75, as best seen in FIG. 8, the recesses 77 and 78 being aligned with each other in the manner of the structure shown in FIG. 2.

The operation of the spacer of FIGS. 7 and 8 is similar to that described above in connection with FIGS. 1 and 2, except that only one damping element is available for dissipating the energy of conductor vibration. Where such a single damping element is sufficient, device of FIGS. 7 and 8 provides a light weight, compact and inexpensive damping spacer since only two arm components and a single damping element are used to provide damping and spacing for a three conductor bundle.

Figure 9:
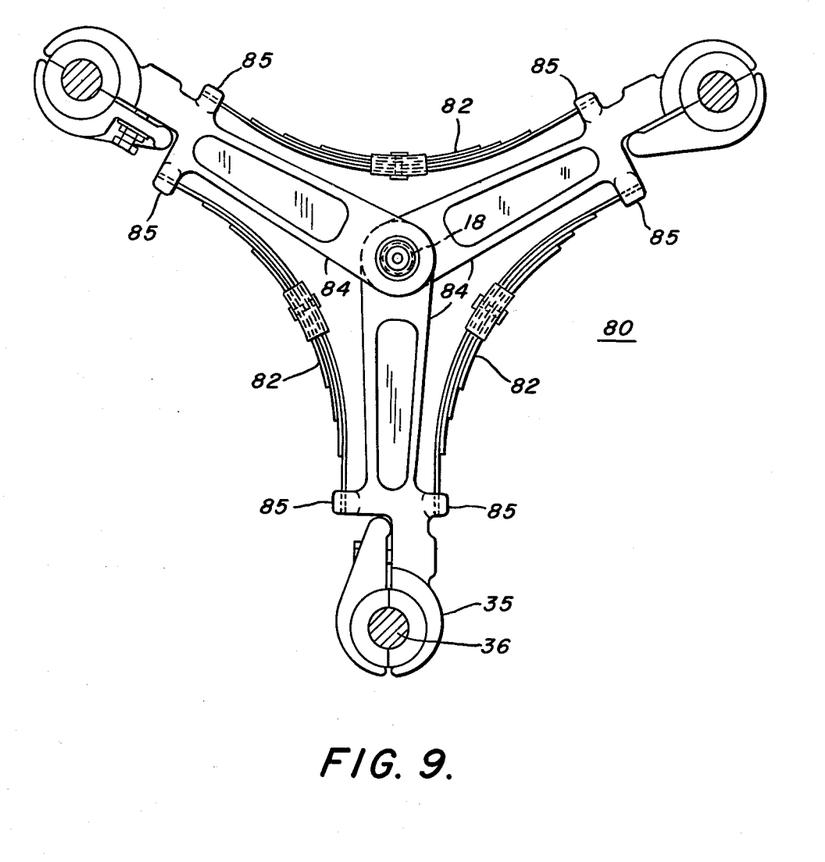
FIG. 9 is an elevation view of an embodiment of the invention using leaf springs as a damping mechanism.

FIG. 9 of the drawings shows a damping spacer 80 in which leaf springs 82 are employed to resiliently connect together spacer arms 84 of a damping spacer, the ends of the longest of the leaves extending into integral bosses 85 of the arms. Conductor vibration and oscillation are damped by inter-leaf friction of springs 82 occurring with relative movement of the arms (about a pivot location 18 of the arms) the operation of spacer 80 being otherwise the same as that described above in connection with the embodiment of FIGS. 1 and 2.

While the invention has been described in terms of preferred embodiments, the claims appended hereto are intended to encompass all embodiments which fall within the spirit of the invention.

Having thus described my invention and certain embodiments thereof, I claim:

1. A frameless damping spacer for overhead conductors comprising at least two elongated, rigid, spacer arms pivotally connected to each other at one of their ends adjacent a central location of the spacer, rigid pin means pivotally connecting the one end of said arms to each other, conductor clamps respectively located at the other ends of said arms remote from said central location for connecting the arms to respective overhead conductors, with each conductor clamp having a groove for receiving one of the conductors, and resilient damping means resiliently connecting the arms together, said resilient damping means having a longitudinal axis extending in a direction substantially perpendicular to the longitudinal axes of the spacer arms, and generally parallel to the axes of the grooves of the conductor clamps.

2. The damping spacer of claim 1 in which the resilient damping means comprises a close wound, helical spring having adjacent helical turns adapted to slide one relative to the other with relaive motion or rotation of the spacer arms about the rigid pin means pivotally connecting the arms to each other.

3. The damping spacer of claim 2 in which the close wound spring is held against rotation relative to the spacer arms by end extensions of the spring extending respectively into openings provided in each of the spacer arms.

4. The damping spacer of claim 1 in which the resilient damping means is a body of viscoelastic material having a longitudinal axis extending in a direction substantially perpendicular to the longitudinal axes of the spacer arms.

5. The spacer of claim 1 in which the spacer arms are disposed in overlapping relationship with one another at the central location, and are respectively provided with openings that are aligned with one another, the rigid pin means pivotally connecting the arms to each extending through said aligned openings.

6. The spacer of claim 5 in which the diameters of the rigid pin means and the aligned openings in the arms are substantially the same.

7. The spacer of claim 5 in which the resilient damping means comprises a close wound helical spring, with the rigid pin means extending through said spring.

8. The damping spacer of claim 1 including a plate member connected to the spacer arms by the rigid pin means pivotally connecting the arms to each other, with the resilient damping means extending between the plate member and each of the arms at locations spaced from the rigid pin means along the axes of the spacer arms and in a direction perpendicular to the plate member and arms.

9. The spacer of claim 8 in which the spacer arms and the plate member are provided with opposed recesses receiving opposed ends of the resilient damping means.

10. The damping spacer of claim 9 in which the resilient damping means includes a close wound, helical spring having an open wound, helical end portion extending into a recess of the plate member.

11. The spacer of claim 8 in which one of the spacer arms is curved to locate the resilient damping means associated therewith at a position that is offset from vertical alignment with the central location of the spacer.

12. The spacer of claim 8 in which the spacer arms and the plate member are provided with a plurality of recesses, the recesses in the arms being spaced apart lengthwise of the arms.

13. The spacer of claim 1 including at least three spacer arms for spacing at least three parallel conductors, with two of said spacer arms being a unitary structure pivotally connected to a third arm.

14. The structure of claim 13 in which the unitary arm structure is provide with an integral extension extending to a location on the third arm that is radially spaced from the central location of the spacer, with the resilient damping means located between the third arm and the extension of the unitary arm structure.

15. A frameless damping spacer for overhead conductors comprising at least two elongated, rigid spacer arms pivotally connected to each other adjacent a central location of the spacer, rigid means pivotally connecting the arms to each other at said central location, means located at the ends of said arms remote from said central location for connecting the arms to respective overhead conductors, and, a leaf spring extending between and resiliently connecting the arms together.

* * * * *

UNITED STATES PATENT AND TRADEMARK OFFICE
CERTIFICATE OF CORRECTION

PATENT NO. : 3,939,300
DATED : February 17, 1976
INVENTOR(S) : Ronald G. Hawkins It is certified that error appears in the above-identified patent and that said Letters Patent are hereby corrected as shown below:

| | |
|---|---|
| Col. 1, line 35 | Change "high" to --higher--. |
| Col. 2, line 6 | Change "arm" to --arms--. |
| Col. 3, line 24 | Change "clampling" to --clamping--. |
| Col. 6, line 48 | Change "by" to --be--. |
| Col. 7, line 45 | Change "forces" to --forced--. |
| Col. 8, line 21 | Change "in" to --to--. |
| Col. 9, line 31 | After "of" cancel "the". |
| Col. 9, line 63 | After "sufficient," insert --the--. |
| Col. 10, line 36 | Change "relaive" (second occurrence) to --relative--. |
| Col. 12, line 4 | Change "provide" to --provided--. |

Signed and Sealed this twenty-seventh Day of April 1976

[SEAL]

Attest:

RUTH C. MASON
*Attesting Officer*

C. MARSHALL DANN
*Commissioner of Patents and Trademarks*